Feb. 18, 1947.          K. W. NOLAN                2,416,205
                       RELIEF VALVE
                   Filed June 22, 1945
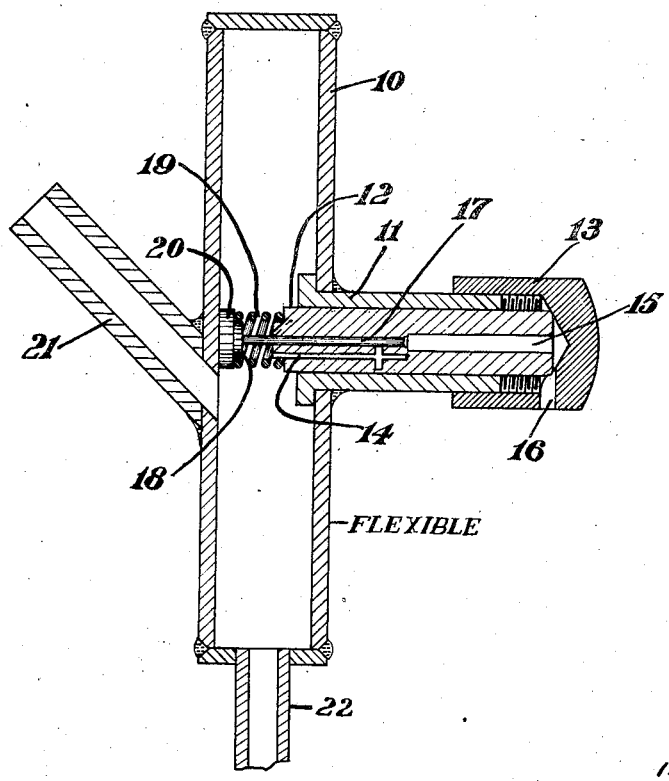
INVENTOR.
K. W. Nolan
By William C. Linton
    Atty.

Patented Feb. 18, 1947

2,416,205

UNITED STATES PATENT OFFICE 2,416,205

RELIEF VALVE

Kenneth William Nolan, East Perth, Western Australia, Australia

Application June 22, 1945, Serial No. 600,944
In Australia February 21, 1944

2 Claims. (Cl. 137—53)

This invention relates to improvements in the relief valves of hydraulic systems for operating machines.

The invention more specifically concerns an improved adjustable relief valve and a pressure reservoir associated therewith adapted to smooth out the pump impulses.

The invention consists broadly of a container or reservoir that under pressure has one part acting as a diaphragm so that the movement under pressure duly opens the relief valve at the predetermined pressure. The container or pressure reservoir simultaneously functions to smooth out the impulses generated by the hydraulic pump if this is of the piston type.

The invention will readily be understood by reference to the accompanying drawing showing the apparatus in sectional elevation.

As shown in the drawing, there is an oil pressure box or reservoir 10 which need have no considerable capacity, but which must be built of material sufficiently strong to withstand the maximum pressure generated by the pump, and which in one part at least will respond to increasing pressure by flexing sufficiently so as to act as a diaphragm. This increase in capacity caused by the diaphragm action serves very efficiently to smooth out the pump impulses, particularly if the hydraulic pump is of the piston type. Attached to or integral with the pressure reservoir is the body 11 of the relief valve. Inside this relief valve fits a valve piston 12. This piston at one end is engaged against a screw control sleeve member 13, the function of which will subsequently become apparent. Inside the valve piston 12 there is an oil duct 14 communicating with the interior of the reservoir and also in communication (unless this is prevented) with another oil duct 15 that passes out of the end of the piston and communicates with an oil duct 16 in the control sleeve. Adapted to move inside an extension of the oil duct 15 is a valve spindle 17 that extends out into the reservoir and terminates in a foot member 18. Between the foot member 18 and the end of the valve piston 12 is placed a stout spring 19 that has the effect of keeping the valve foot 18 up against the side of the box, or more conveniently against a stop member 20 provided for this purpose. The spring also acts to maintain the valve piston 12 against the end of the control sleeve 13. In the drawing, the inlet for the oil is referenced 21 and the outlet may be at any convenient point or as indicated at 22.

The apparatus operates as follows.

Oil enters the pressure box 10 through the inlet 21 and normally passes out through the outlet 22, to the means actuating the hydraulic feed. The considerable pressure generated serves to some extent to flex the material of the reservoir and this smooths out the impulses of the hydraulic pump, particularly if this is of the piston type. When the pressure reaches the predetermined level, the effect is that one side or both opposite sides of the reservoir acts as a diaphragm and the distance between the sides is increased. The effect of this is that under the influence of the spring 19 the relative position of the valve spindle 17 inside the extension of the duct 15 is changed. In other words, the valve spindle moves in the duct and ultimately uncovers the communication between the ducts 14 and 15. When this happens, oil escapes through the duct 16 and the pressure is relieved until a state of balance is reached.

It will be obvious that the further the control sleeve 13 is screwed in, the greater distance will the valve spindle 17 have to travel before the communication between the ducts 14 and 15 is established. In other words, screwing in of the control sleeve 13 increases the pressure that must be reached before oil is by-passed through the relief valve.

I claim:

1. Improvements in and relating to relief valves of hydraulic systems for operating machines comprising the combination of a container or reservoir that under pressure has at least one side acting as a diaphragm; an inlet for said reservoir, a valve body connected to one side of said reservoir; a valve piston movable inside the valve body; a control member that can be screwed on the valve body so as to press against and control the position of the valve piston; one intercommunicating ducts in the valve piston; one duct communicating with the interior of the reservoir and the other duct providing an outlet, a valve spindle engaging the other side of the reservoir and adapted to move in an extension of one of these ducts and to control communication between the two ducts in response to the relative movements of the walls of the reservoir; and a spring that abuts at one of its ends against an extension of the valve spindle and at its other end against the valve piston.

2. Improvements in and relating to relief valves of hydraulic systems for operating machines as set out in claim 1, in which the control member has a duct providing communication between the outlet duct of the valve piston and the exterior of the reservoir.

KENNETH WILLIAM NOLAN.

REFERENCES CITED

The following references are of record in the file of this patent:

UNITED STATES PATENTS

| Number | Name | Date |
|---|---|---|
| 1,236,583 | Manning | Aug. 14, 1917 |
| 1,815,394 | Boosey | July 21, 1931 |
| 1,502,739 | Munzinger | July 29, 1924 |
| 1,776,937 | Timbs | Sept. 30, 1930 |
| 1,207,882 | Dorff | Dec. 12, 1916 |
| 2,251,275 | Ernst | Aug. 5, 1941 |